United States Patent
Yu

(10) Patent No.: US 11,457,266 B2
(45) Date of Patent: Sep. 27, 2022

(54) METHOD FOR SYNCHRONIZING AUDIO AND VIDEO AND RELATED APPARATUS

(71) Applicant: Realtek Semiconductor Corporation, Hsinchu (TW)

(72) Inventor: Chen-Wei Yu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/930,645

(22) Filed: Jul. 16, 2020

(65) Prior Publication Data

US 2021/0021889 A1  Jan. 21, 2021

Related U.S. Application Data

(60) Provisional application No. 62/875,943, filed on Jul. 18, 2019.

(30) Foreign Application Priority Data

May 7, 2020 (TW) .................................. 109115252

(51) Int. Cl.
*H04N 5/04* (2006.01)
*H04N 21/43* (2011.01)
*H04N 21/8547* (2011.01)

(52) U.S. Cl.
CPC .......... *H04N 21/4307* (2013.01); *H04N 5/04* (2013.01); *H04N 21/8547* (2013.01)

(58) Field of Classification Search
CPC .... H04N 5/04; H04N 21/242; H04N 21/8547; H04N 21/4307; H04N 5/08; H04N 9/475

USPC .......................... 348/500, 512, 513, 515, 547
See application file for complete search history.

(56) References Cited

U.S. PATENT DOCUMENTS

| | | | |
|---|---|---|---|
| 7,471,337 B2* | 12/2008 | Wells | H04N 7/56 348/512 |
| 8,705,942 B2 | 4/2014 | Evans et al. | |
| 9,179,118 B2 | 11/2015 | Zeng et al. | |
| 9,237,324 B2 | 1/2016 | Lee et al. | |
| 2001/0022823 A1* | 9/2001 | Renaud | H04B 7/2125 375/359 |
| 2006/0156375 A1 | 7/2006 | Konetski | |

(Continued)

OTHER PUBLICATIONS

China Patent Office, Office Action of the corresponding Chinese application No. 202010424282.3, dated Jan. 30, 2022.

*Primary Examiner* — Sherrie Hsia

(74) *Attorney, Agent, or Firm* — Locke Lord LLP; Tim Tingkang Xia, Esq.

(57) ABSTRACT

An audio and video synchronization method is provided, which includes the following operations: obtaining a first presentation time stamp (PTS) of a first video data and a second PTS of a second video data; selecting a master PTS corresponding to an audio data or to a vertical synchronization (Vsync) pulse; calculating a first timestamp difference value between the first PTS and the master PTS, and calculating a second timestamp difference value between the second PTS and the master PTS; and selectively outputting either the first video data or the second video data according to the first timestamp difference value, the second timestamp difference value, and whether the first video data has been outputted for a predetermined number of times.

20 Claims, 7 Drawing Sheets

(56) References Cited

U.S. PATENT DOCUMENTS

| | | | |
|---|---|---|---|
| 2006/0284996 A1* | 12/2006 | Kanai | H04N 5/23241 |
| | | | 348/294 |
| 2007/0002902 A1 | 1/2007 | Hannuksela | |
| 2007/0013807 A1* | 1/2007 | Kanai | H04N 5/247 |
| | | | 348/362 |
| 2008/0198921 A1* | 8/2008 | Kim | H04N 21/4307 |
| | | | 375/240.01 |
| 2010/0061406 A1* | 3/2010 | Tatsuta | H04N 21/4305 |
| | | | 370/503 |
| 2010/0315553 A1 | 12/2010 | Takatsuji et al. | |
| 2011/0001873 A1 | 1/2011 | Doswald et al. | |
| 2012/0042047 A1 | 2/2012 | Chen et al. | |
| 2013/0321701 A1* | 12/2013 | Halna Du Fretay | G09G 3/002 |
| | | | 348/512 |
| 2014/0010515 A1 | 1/2014 | Lee et al. | |
| 2015/0062353 A1 | 3/2015 | Dalal et al. | |
| 2015/0304526 A1* | 10/2015 | Maurice | H04N 21/4307 |
| | | | 348/513 |
| 2015/0340009 A1* | 11/2015 | Loeffler | G06F 3/1446 |
| | | | 345/1.3 |
| 2015/0348509 A1 | 12/2015 | Verbeure et al. | |
| 2018/0160151 A1* | 6/2018 | Sprenger | H04N 19/117 |

* cited by examiner

METHOD FOR SYNCHRONIZING AUDIO AND VIDEO AND RELATED APPARATUS

CROSS-REFERENCE TO RELATED APPLICATION

This application claims priority to U.S. Provisional Application Ser. No. 62/875,943, filed Jul. 18, 2019; and Taiwan Application Number 109115252, filed on May 7, 2020, the content of each of which is hereby incorporated by reference in their entirety.

BACKGROUND

Technical Field

The present disclosure generally relates to an audio and video processing method. More particularly, the present disclosure relates to an audio and video synchronization method.

Description of Related Art

By connecting a set-up box and a television, the television can receive digital content transmitted by various wired and wireless means, such as high-quality audio and video streaming. In many cases, the frame rate of the video stream changes due to the delay of the transmission process. Therefore, the traditional set-top box might sends video data of the video stream to the television too many or too few times, causing the video and audio being out of sync.

SUMMARY

The disclosure provides an audio and video synchronization method, which includes the following operations: obtaining a first presentation time stamp (PTS) of a first video data and a second PTS of a second video data; selecting a master PTS corresponding to an audio data or to a vertical synchronization (Vsync) pulse; calculating a first timestamp difference value between the first PTS and the master PTS, and calculating a second timestamp difference value between the second PTS and the master PTS; and selectively outputting either the first video data or the second video data according to the first timestamp difference value, the second timestamp difference value, and whether the first video data has been outputted for a predetermined number of times.

The disclosure provides another audio and video synchronization method, which includes the following operations: obtaining a first PTS of a first video data and a second PTS of a second video data; selecting a master PTS corresponding to an audio data or to a Vsync pulse; calculating a first timestamp difference value between the first PTS and the master PTS, and calculating a second timestamp difference value between the second PTS and the master PTS; and determining whether to output the second video data according to the first timestamp difference value, the second timestamp difference value, and whether the first video data has been outputted.

The disclosure provides an audio and video processing apparatus including a decoder, an encoding and transmission unit, and a synchronization controller. The decoder is configured to decode a video stream and an audio stream to obtain a first video data, a second video data, and an audio data. The encoding and transmission unit is configured to output the audio data and a Vsync pulse, and is configured to selectively output either the first video data or the second video data. The synchronization controller is coupled with the decoder and the encoding and transmission unit, is configured to receive a first PTS of the first video data, a second PTS of the second video data, and a master PTS corresponding to the audio data or to the Vsync pulse, is configured to calculate a first timestamp difference value between the first PTS and the master PTS, and is configured to calculate a second timestamp difference value between the second PTS and the master PTS. The synchronization controller is further configured to indicate the encoding and transmission unit to selectively output either the first video data or the second video data according to the first timestamp difference value, the second timestamp difference value, and whether the first video data has been outputted for a predetermined number of times.

It is to be understood that both the foregoing general description and the following detailed description are by examples, and are intended to provide further explanation of the disclosure as claimed.

DETAILED DESCRIPTION

Figure 1:
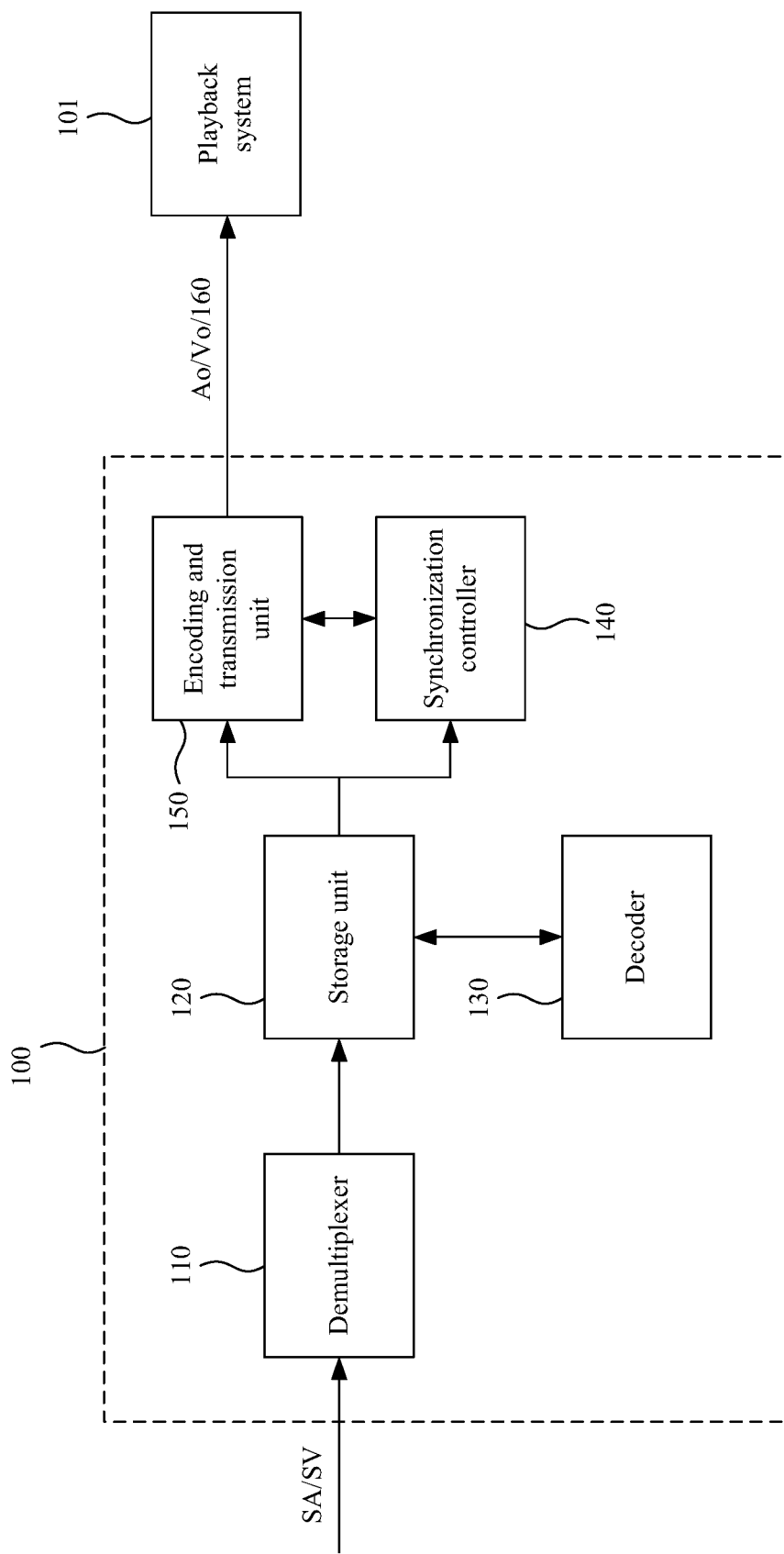
FIG. 1 is a simplified functional block diagram of an audio and video processing apparatus according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a simplified functional block diagram of an audio and video processing apparatus 100 according to one embodiment of the present disclosure. The audio and video processing apparatus 100 comprises a demultiplexer 110, a storage unit 120, a decoder 130, a synchronization controller 140, and an encoding and transmission unit 150. The audio and video processing apparatus 100 is configured to be coupled with a playback system 101, and configured to provide control signals (e.g., the horizontal synchronization (Hsync) signal, the vertical synchronization (Vsync) signal 160, the gray scale data, etc.) to the playback system 101 according to the received audio stream SA and the video stream SV.

In some embodiments, the audio and video processing apparatus 100 may be realized by the set-top box. The playback system 101 may be realized by a television comprising speakers or by a home theater system.

The demultiplexer 110 is coupled with the storage unit 120. When the demultiplexer 110 receives the audio stream SA and the video stream SV transmitted by wired or wireless communication, the demultiplexer 110 stores the audio packets of the audio stream SA and the video packets of the video stream SV respectively in corresponding blocks of the storage unit 120. For instance, the audio packets may be stored in a first in first out (FIFO) buffer of the storage unit 120, while the video packets may be stored in another FIFO buffer of the storage unit 120, but this disclosure is not limited thereto. The audio packet comprises a header and a payload, where the content of the payload comprises a plurality of audio data Ao respectively corresponding to a plurality of frames, and the header carries the playback order of the plurality of audio data Ao. In one embodiment, the header of the audio packet comprises the presentation time stamps (PTSs) of the plurality of audio data Ao. Similarly, the payload of the video packet comprises a plurality of video data Vo respectively corresponding to a plurality of frames, and the header of the video packet comprises the playback order of the plurality of video data Vo, such as the PTSs of the plurality of video data Vo.

The decoder 130 is configured to decode the audio packets and the video packets stored in the storage unit 120 to obtain the plurality of audio data Ao, the plurality of video data Vo, and the corresponding PTSs. The obtained audio data Ao and video data Vo may be stored into the storage unit 120 by the decoder 130, and then be retrieved by the encoding and transmission unit 150. Alternatively, the decoder 130 may provide the obtained audio data Ao and video data Vo directly to the encoding and transmission unit 150. The encoding and transmission unit 150 is configured to encode, according to the communication protocol between the encoding and transmission unit 150 and the playback system 101, the audio data Ao and the video data Vo to suitable format and then transmits to the playback system 101. In one embodiment, the encoding and transmission unit 150 may be coupled with the playback system 101 through the high definition multimedia interface (HDMI).

Additionally, the obtained PTSs may be stored into the storage unit 120 by the decoder 130, and then be retrieved by the synchronization controller 140. Alternatively, the decoder 130 may provide the obtained PTSs directly to the synchronization controller 140. The synchronization controller 140 is configured to control, according to the received PTSs, the output pattern of the encoding and transmission unit 150, such as whether to repeatedly transmit the same video data Vo, and/or whether to omit one of the plurality of video data Vo, where the omitted video data Vo will not be transmitted to the playback system 101.

In practice, the storage unit 120 may be realized by various suitable volatile or nonvolatile memory circuits. The decoder 130, the synchronization controller 140, and the encoding and transmission unit 150 may be realized by hardware, software stored in the storage unit 120 in advance, or the combination thereof.

Figure 2:
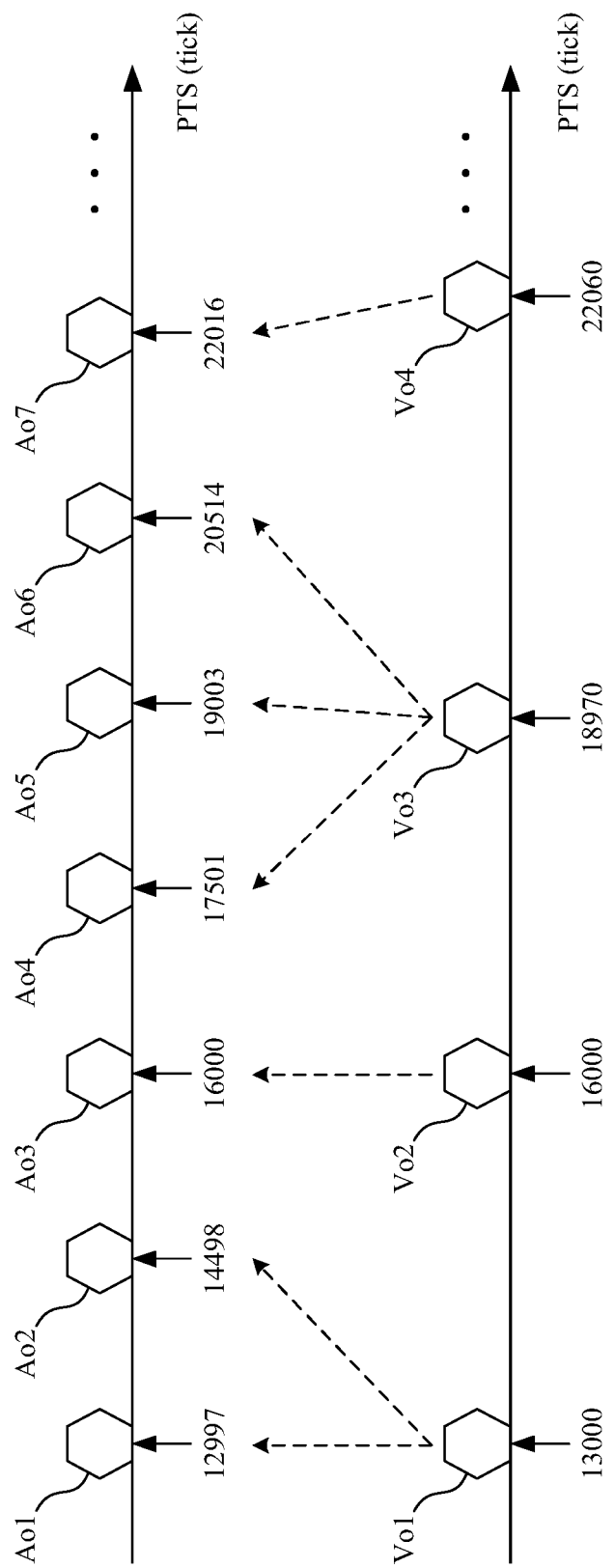
FIG. 2 is a schematic diagram for illustrating the time correspondence relationship between audio data and video data according to one embodiment of the present disclosure.

FIG. 2 is a schematic diagram for illustrating the time correspondence relationship between the audio data Ao and the video data Vo according to one embodiment of the present disclosure. In an audio master mode, the PTS of each audio data Ao may be taken as the master PTS, the video data Vo which is closest to the master PTS in time is outputted with the audio data Ao corresponding to the master PTS. The unit of the PTS and the master PTS is tick. As shown in FIG. 2, the audio stream SA provides the plurality of audio data Ao (e.g., the audio data Ao1-Ao7) with a frame rate of 59.94 fps, and the video stream SV provides the plurality of video data Vo (e.g., the video data Vo1-Vo4) with a frame rate of 30 fps. Therefore, in a pattern of normal operation, when approximately every 500 video data Vo have been outputted, there is one video data Vo being repeatedly outputted for two times. The developers may arrange the plurality of audio data Ao and the plurality of video data Vo in advance based on that pattern so as to achieve synchronization between audio and video. However, when the frame rate of the video stream SV has variations, there is a possibility that one video data Vo is erroneously outputted for more than two times. For example, the video data Vo3 having the PTS of 18970 is outputted for three times with the three audio data Ao4, Ao5, and Ao6 respectively having the PTSs of 17501, 19003, and 20514, which may cause the asynchronous audio and video.

Figure 3:
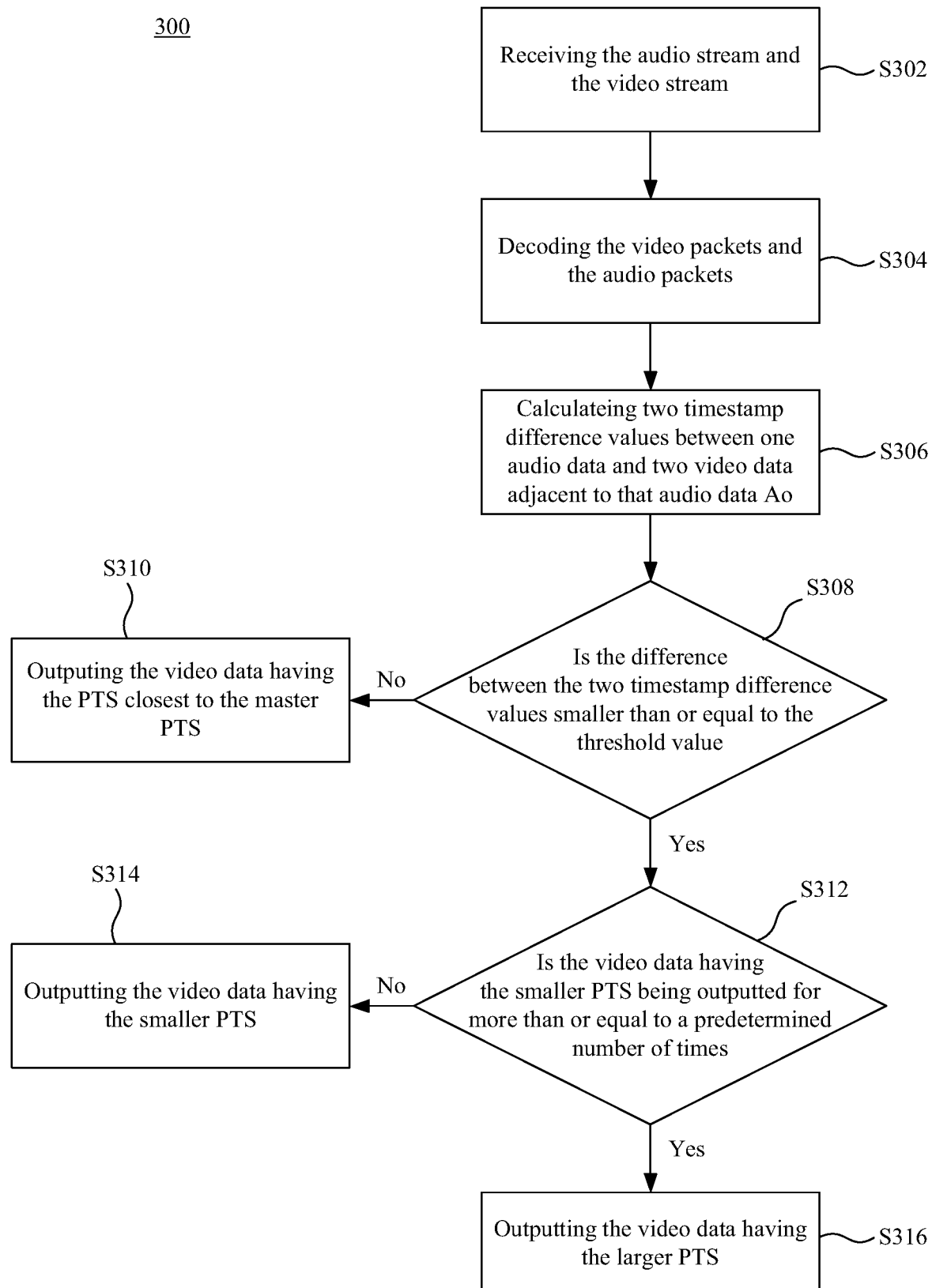
FIG. 3 is a flowchart of an audio and video synchronization method according to one embodiment of the present disclosure.
Figure 4:
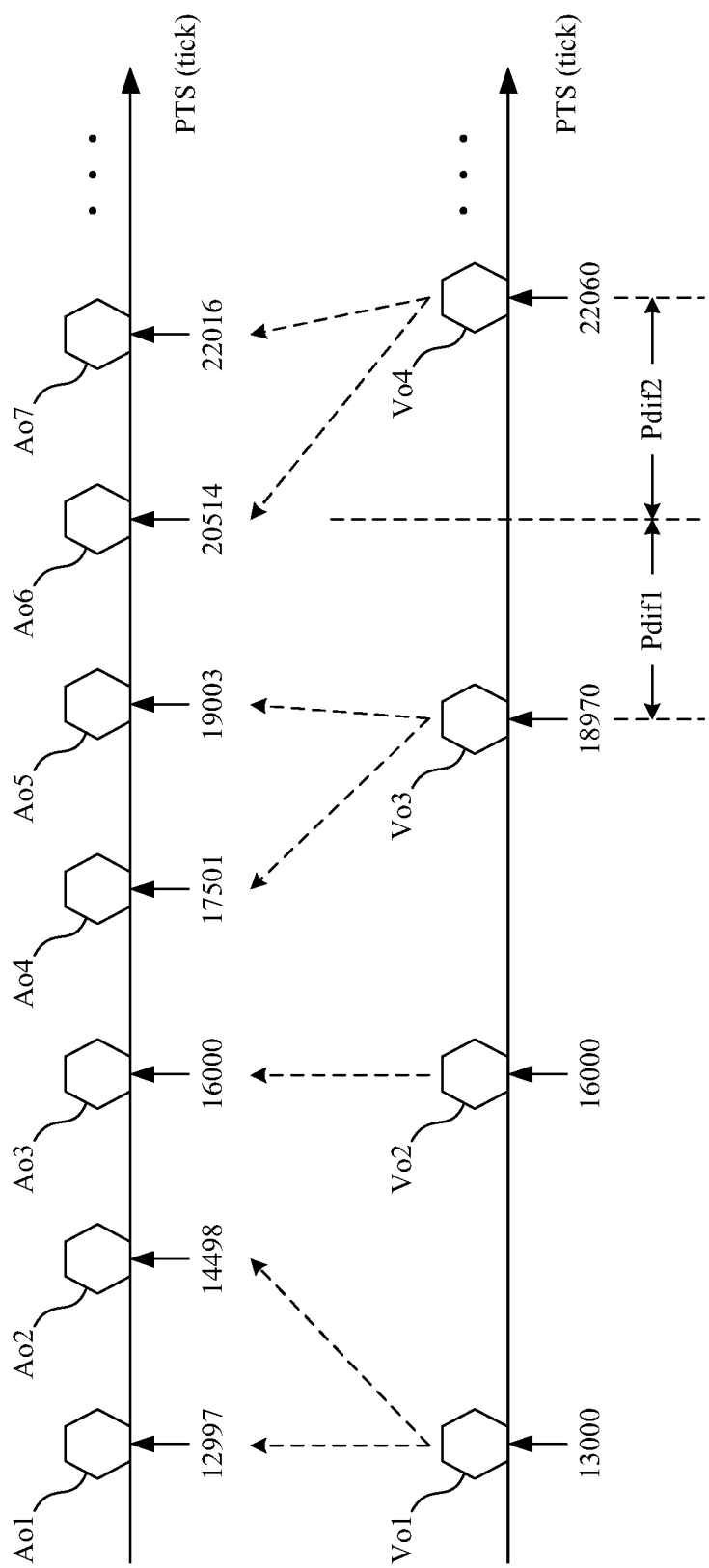
FIG. 4 is a schematic diagram for illustrating the time correspondence relationship between audio data and video data according to one embodiment of the present disclosure.

FIG. 3 is a flowchart of an audio and video synchronization method 300 according to one embodiment of the present disclosure. FIG. 4 is a schematic diagram for illustrating the time correspondence relationship between the audio data Ao and the video data Vo according to one embodiment of the present disclosure. The aforementioned audio and video processing apparatus 100 is suitable for performing the audio and video synchronization method 300. As shown in FIG. 4, the audio stream SA provides the plurality of audio data Ao (e.g., the audio data Ao1-Ao7) with a frame rate of 59.94 fps, and the video stream SV provides the plurality of video data Vo (e.g., the video data Vo1-Vo4) with a frame rate of 30 fps. Reference is made to FIG. 3 and FIG. 4. In operation S302, the demultiplexer 110 receives the audio stream SA and the video stream SV, and stores the audio packets of the audio stream SA and the video packets of the video stream SV respectively in corresponding blocks of the storage unit 120.

In operation S304, the decoder 130 decodes the video packets and the audio packets in the storage unit 120 to obtain the plurality of audio data Ao (e.g., the audio data Ao1-Ao7 of FIG. 4) and the plurality of video data Vo (e.g., the video data Vo1-Vo4 of FIG. 4), and also to obtain the PTSs of the plurality of audio data Ao and the PTSs of the plurality of video data Vo.

In operation S306, the synchronization controller 140 retrieves the PTSs of the plurality of audio data Ao and the PTSs of the plurality of video data Vo. The synchronization controller 140 further calculates two timestamp difference values between one audio data Ao and two video data Vo adjacent to that audio data Ao, so as to determine whether there is a possibility of asynchronous audio and video. The processes for calculating the timestamp difference value are as follows: selecting the PTS of that audio data Ao as the master PTS; subtracting the master PTS from the PTSs of the two video data Vo, respectively; and take the absolute values of these subtraction results.

For example, the synchronization controller 140 may select the PTS of the audio data Ao6 of FIG. 4 as the master PTS, and thus the master PTS has a value of 20514. Then, the synchronization controller 140 calculates a first timestamp difference value Pdif1 (i.e., 1544) between the audio data Ao6 and the video data Vo3 having a PTS of 18970, and also calculates a second timestamp difference value Pdif2 (i.e., 1546) between the audio data Ao6 and the video data Vo4 having a PTS of 22060.

In operation S308, the synchronization controller 140 further calculates a difference between the two timestamp difference values generated in operation S306. If the difference between the two timestamp difference values is larger than a threshold value, the synchronization controller 140 determines that the audio and video will be synchronous, and then conducts operation S310. If the difference between the two timestamp difference values is smaller than or equal to the threshold value, the synchronization controller 140 determines that the audio and video may be asynchronous, and then conducts operation S312.

In operation S310, the synchronization controller 140 instructs the encoding and transmission unit 150 to output the video data Vo having the PTS closest to the master PTS (i.e., the video data Vo corresponding to the smaller one of the two aforementioned timestamp difference values). The synchronization controller 140 further outputs the audio data Ao corresponding to the master PTS.

The threshold value may be stored in the storage unit 120 in advance. In practice, the threshold value may be configured according to the frame rate of the video stream SV, the frame rate of the audio stream SA, the frequency of the Vsync signal 160, and/or other practical design requirements.

In this embodiment, the threshold value is set to 20 ticks, but this disclosure is not limited thereto. In the situation that the PTS of the audio data Ao6 of FIG. 4 is selected as the master PTS, since the difference between the first timestamp difference value Pdif1 (i.e., 1544) and the second timestamp difference value Pdif2 (i.e., 1546) is 2, which is smaller than the threshold value, the audio and video processing apparatus 100 then performs operation S312. In some embodiments, the threshold value may be a positive integer within a range of 20 to 50 (ticks), such as 30, 35, or 40.

In operation S312, the synchronization controller 140 further determines whether the video data Vo, having the smaller PTS among the two video data Vo adjacent to the master PTS, is provided to the playback system 101 for more than or equal to a predetermined number of times. If not, the audio and video processing apparatus 100 conducts operation S314, and the synchronization controller 140 instructs the encoding and transmission unit 150 to provide the video data Vo having the smaller PTS to the playback system 101 in operation S314. If yes, the audio and video processing apparatus 100 conducts operation S316, and the synchronization controller 140 instructs the encoding and transmission unit 150 to provide the video data Vo, having the larger PTS among the two video data Vo adjacent to the master PTS, to the playback system 101 in operation S316.

For example, the audio and video processing apparatus 100 may configure a counter having an initial value of 0 for each video data Vo. When one video data Vo is provided to the playback system 101, the corresponding counter increases by 1.

In this embodiment, the processes of calculating the predetermined number of times are as follows: dividing the frame rate of the audio stream SA by the frame rate of the video stream SV; and rounding the quotient to the nearest whole number. For example, if the audio and video processing apparatus 100 is configured to process the audio data Ao having the frame rate of 59.94 fps and the video data Vo having the frame rate of 30 fps of FIG. 4, the predetermined number of times is set to 2. In other words, the predetermined number of times is substantially equal to the quotient calculated by dividing the frame rate of the audio stream SA by the frame rate of the video stream SV. Therefore, in the situation that the PTS of the audio data Ao6 is taken as the master PTS, since the video data Vo3 has been outputted for twice, the encoding and transmission unit 150 selects the video data Vo4 to provide to the playback system 101.

In the situation of FIG. 4, when approximately every 500 video data Vo have been outputted, one of the plurality of video data Vo is outputted for twice. The audio and video synchronization method provided by this disclosure prevents the same video data Vo to be outputted for an excessive number of times, so that the audio data Ao and the video data Vo are processed by the playback system 101 in a regular pattern to prevent asynchronization between audio and video.

Notably, in the above embodiments, configuring the audio stream SA and the video stream SV to respectively have the frame rates of 59.94 fps and 30 fps is merely for the purpose of explanation convenience. The audio and video synchronization method 300 is suitable for all cases that the frame rate of the audio stream SA is higher than or equal to the frame rate of the video stream SV.

Figure 5:
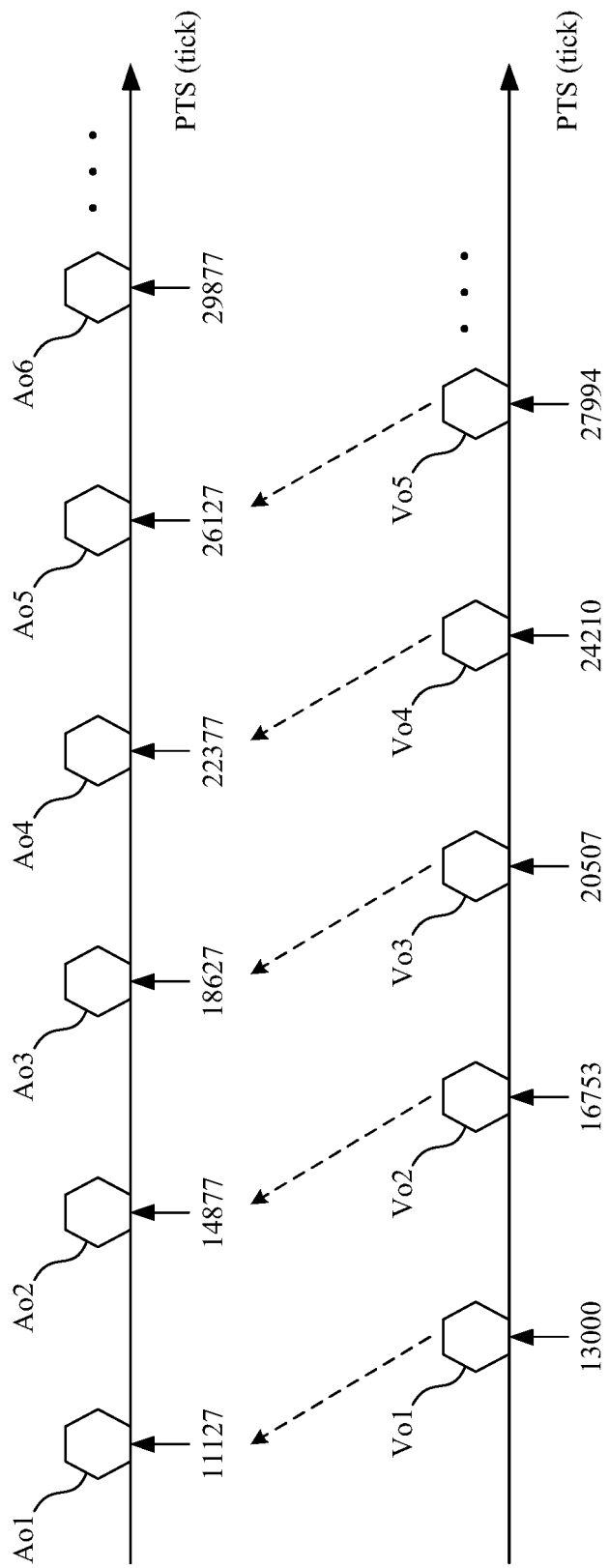
FIG. 5 is a schematic diagram for illustrating the time correspondence relationship between audio data and video data according to another embodiment of the present disclosure.

FIG. 5 is for illustrating the time correspondence relationship between the plurality of audio data Ao (e.g., the audio data Ao1-Ao6) and the plurality of video data Vo (e.g., the video date Vo1-Vo5) in a situation that the audio stream SA and the video stream SV have approximately the same frame rates. In this embodiment, the audio stream SA provides the audio data Ao with a frame rate of 24 fps, and the video stream SV provides the video data Vo with a frame rate of 23.97 fps. According to the aforementioned audio and video synchronization method 300, the predetermined number of times may be set to 1. In a situation that the synchronization controller 140 selects the PTS of the audio data Ao3 of FIG. 5 as the master PTS, the synchronization controller 140 determines, in operation S312, the video data Vo2 has been provided to the playback system 101 for the predetermined number of times (i.g., one time). Therefore, even though the video data Vo2 is closer to the audio data Ao3 then the video data Vo3, the encoding and transmission unit 150 provides, in operation S314, the video data Vo3 together with the audio data Ao3 to the playback system 101, instead of outputting the video data Vo2 together with the audio data Ao3.

Consequently, the same video data Vo2 will not be erroneously outputted for twice, and the video data Vo3 is prevented from not being provided to the playback system 101 caused by being erroneously omitted, thereby preventing asynchronous audio and video.

Figure 6:
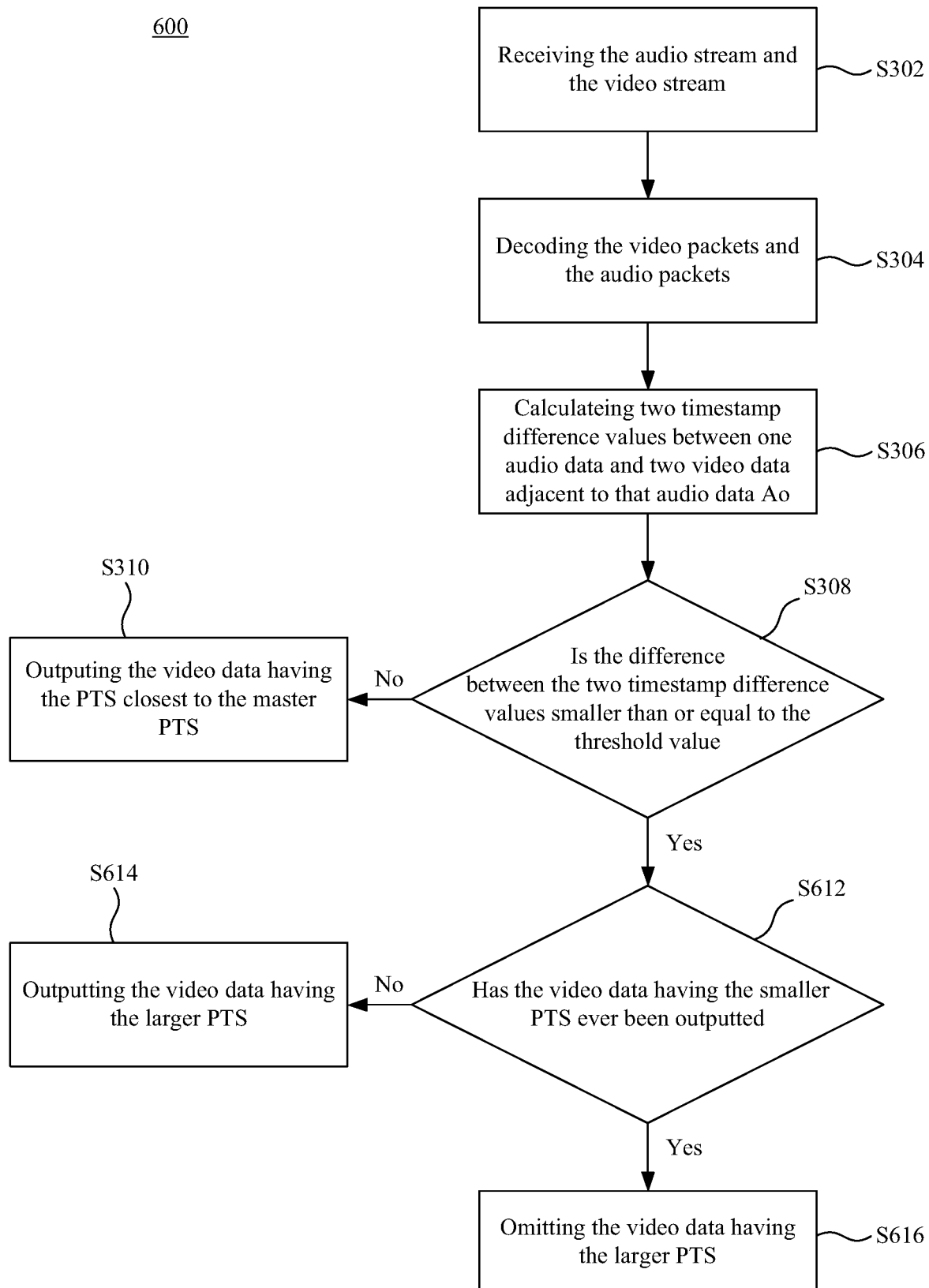
FIG. 6 is a flowchart of an audio and video synchronization method according to one embodiment of the present disclosure.
Figure 7:
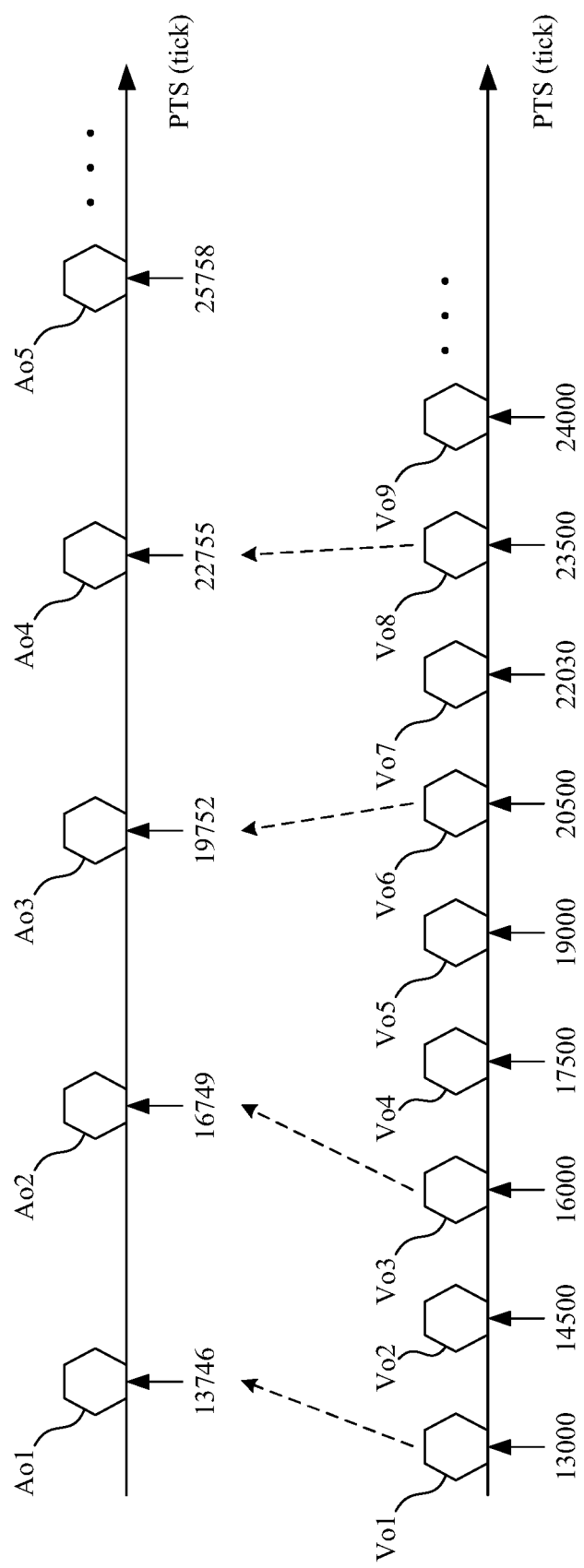
FIG. 7 is a schematic diagram for illustrating the time correspondence relationship between audio data and video data according to one embodiment of the present disclosure.

FIG. 6 is a flowchart of an audio and video synchronization method 600 according to one embodiment of the present disclosure. FIG. 7 is a schematic diagram for illustrating the time correspondence relationship between the audio data Ao (e.g., the audio data Ao1-Ao5) and the video data Vo (e.g., the video data Vo1-Vo9) according to one embodiment of the present disclosure. Reference is made to FIG. 6 and FIG. 7. In this embodiment, the audio stream SA provides the audio data Ao with a frame rate of 29.97 fps, and the video stream SV provides the video data Vo with a frame rate of 60 fps. Therefore, in the pattern of normal operation, one of the two video data Vo adjacent to each other is omitted and not provided to the playback system 101, and two successive video data Vo are omitted for approximately every 33 seconds. However, if the frame rate of the video stream SV has variations, there may be multiple times in a short time period that two successive video data Vo are omitted, causing asynchronization between audio and video.

The audio and video synchronization method 600 similar to the audio and video synchronization method 300 remedies the aforesaid problem, and the difference is that the audio and video synchronization method 600 replaces operations S312-S316 with operations S612-S616. In operation S612, the synchronization controller 140 determines that whether the video data Vo, having the smaller PTS among the two video data Vo adjacent to the master PTS, has ever been outputted. If not, the audio and video processing apparatus 100 conducts operation S614 to output the video data Vo having the larger PTS among the two video data Vo adjacent to the master PTS, and to output the audio data Ao corresponding to the master PTS. If yes, the audio and video processing apparatus 100 conducts operation S616 to omit the video data Vo having the larger PTS among the two video data Vo adjacent to the master PTS, that is, the encoding and transmission unit 150 will not output the video data Vo having the larger PTS.

In one embodiment, for example, the synchronization controller 140 selects the PTS of the audio data Ao4 of FIG. 7 as the master PTS, and the video data Vo7 and the video data Vo8 are adjacent to the master PTS. Since the video data Vo7 has never been outputted to the playback system 101, the audio and video processing apparatus 100 conducts the operation S614 to output the video data Vo8 and the audio data Ao4. As a result, after the video data Vo4 and Vo5 are omitted, the video data Vo8 and Vo9 will not be erroneously omitted together, avoiding the asynchronization between video and audio.

Notably, in the aforementioned embodiment, configuring the audio stream SA and the video stream SV to respectively have frame rates of 29.97 fps and 60 fps is merely for the purpose of explanation convenience. The audio and video synchronization method 600 is suitable for all cases that the frame rate of the audio stream SA is lower than the frame rate of the video stream SV.

In the multiple above embodiments, the audio and video synchronization methods 300 and 600 are applied to the audio master mode, but this disclosure is not limited thereto. In some embodiments, the audio and video synchronization methods 300 and 600 are also suitable for the video master mode. In the video master mode, the audio and video processing apparatus 100 outputs the video data Vo according to the PTS of the vertical synchronous (Vsync) pulse of the Vsync signal 160, and outputs the audio data Ao according to the PTS of the video data Vo. The Vsync signal 160 may be generated by the synchronization controller 140, the encoding and transmission unit 150, or other circuits (not shown) of the audio and video processing apparatus 100. The Vsync pulse of the Vsync signal 160 is configured to inform the playback system 101 to start to display a new frame.

In some embodiments of the video master mode, the audio and video synchronization method 300 is suitable for the cases that the frame rate of the Vsync signal 160 is higher than or equal to the frame rate of the video stream SV. In this situation, during operation S306 of the audio and video synchronization method 300, the synchronization controller 140 selects the PTS of one Vsync pulse as the master PTS, and calculates two timestamp difference values between the Vsync pulse and the two video data Vo adjacent to that Vsync pulse. In addition, the processes of calculating the predetermined number of times in operation S312 are as follows: dividing the frequency of the Vsync signal 160 by the frame rate of the video stream SV; and rounding the quotient to the nearest whole number. For example, if the Vsync signal 160 has a frequency of 59.94 Hz and the video stream SV has a frame rate of 30 fps, the predetermined number of times is set to 2. That is, the predetermined number of times is substantially equal to the quotient generated by dividing the frequency of the Vsync signal 160 by the frame rate of the video stream SV. The other corresponding operations of the aforementioned audio and video synchronization method 300 are also applicable to those embodiments of the video master mode. For the sake of brevity, those descriptions will not be repeated here.

In other embodiments of the video master mode, the audio and video synchronization method 600 is suitable for the cases that the frequency of the Vsync signal 160 is lower than the frame rate of the video stream SV. In this situation, during operation S306 of the audio and video synchronization method 600, the synchronization controller 140 selects the PTS of one Vsync pulse as the master PTS, and calculates two timestamp difference values between the Vsync pulse and two video data Vo adjacent to that Vsync pulse. The other corresponding operations of the aforementioned audio and video synchronization method 600 are also applicable to those other embodiments of the video master mode. For the sake of brevity, those descriptions will not be repeated here.

The execution order of the operations in the previous flowcharts is merely an example, rather than a restriction to practical implementations. For example, in the previous flowcharts, operation S302 and operation S304 may be performed in parallel. In addition, in some embodiments, the audio and video synchronization method 300 or 600 may be repeatedly performed, so as to ensure that there will no asynchronization between audio and video when each audio data Ao or each Vsync pulse is outputted.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An audio and video synchronization method, comprising:
    obtaining a first presentation time stamp (PTS) of a first video data and a second PTS of a second video data, wherein the first video data and the second video data are corresponding to two different frames, respectively;
    selecting a master PTS corresponding to an audio data or to a vertical synchronization (Vsync) pulse;
    calculating a first timestamp difference value between the first PTS and the master PTS, and calculating a second timestamp difference value between the second PTS and the master PTS; and
    selectively outputting either the first video data or the second video data according to the first timestamp difference value, the second timestamp difference value, and whether the first video data has been outputted for a predetermined number of times.

2. The audio and video synchronization method of claim 1, wherein selectively outputting either the first video data or the second video data comprises:
    if a difference between the first timestamp difference value and the second timestamp difference value is smaller than or equal to a threshold value, and if the first video data has been outputted for more than or equal to the predetermined number of times, outputting the second video data; and
    if the difference between the first timestamp difference value and the second timestamp difference value is smaller than or equal to the threshold value, and if the first video data has been outputted for less than the predetermined number of times, outputting the first video data.

3. The audio and video synchronization method of claim 2, wherein the threshold value is within a range of 20 to 50 ticks.

4. The audio and video synchronization method of claim 1, wherein selectively outputting either the first video data or the second video data comprises:
- if a difference between the first timestamp difference value and the second timestamp difference value is larger than a threshold value, and if the first timestamp difference value is smaller than the second timestamp difference value, outputting the first video data; and
- if the difference between the first timestamp difference value and the second timestamp difference value is larger than the threshold value, and if the first timestamp difference value is larger than the second timestamp difference value, outputting the second video data.

5. The audio and video synchronization method of claim 1, further comprising:
- receiving a video stream comprising the first video data and the second video data;
- receiving an audio stream comprising the audio data; and
- generating a vertical synchronization (Vsync) signal comprising the Vsync pulse,
- wherein the predetermined number of times is determined according to a frame rate of the audio stream, a frequency of the Vsync signal, or a frame rate of the video stream.

6. The audio and video synchronization method of claim 5, wherein the frame rate of the audio stream and the frequency of the Vsync signal are higher than or equal to the frame rate of the video stream.

7. The audio and video synchronization method of claim 1, wherein the first PTS is smaller than the second PTS.

8. An audio and video synchronization method, comprising:
- obtaining a first PTS of a first video data and a second PTS of a second video data, wherein the first video data and the second video data are corresponding to two different frames, respectively;
- selecting a master PTS corresponding to an audio data or to a Vsync pulse;
- calculating a first timestamp difference value between the first PTS and the master PTS, and calculating a second timestamp difference value between the second PTS and the master PTS; and
- determining whether to omit the second video data according to the first timestamp difference value, the second timestamp difference value, and whether the first video data has been outputted.

9. The audio and video synchronization method of claim 8, wherein determining whether to omit the second video data comprises:
- if a difference between the first timestamp difference value and the second timestamp difference value is smaller than or equal to a threshold value, and if the first video data has been outputted, determining to omit the second video data; and
- if the difference between the first timestamp difference value and the second timestamp difference value is smaller than or equal to the threshold value, and if the first video data has never been outputted, determining to output the second video data.

10. The audio and video synchronization method of claim 9, wherein the threshold value is within a range of 20 to 50 ticks.

11. The audio and video synchronization method of claim 8, wherein determining whether to omit the second video data comprises:
- if a difference between the first timestamp difference value and the second timestamp difference value is larger than a threshold value, and if the first timestamp difference value is smaller than the second timestamp difference value, outputting the first video data; and
- if the difference between the first timestamp difference value and the second timestamp difference value is larger than the threshold value, and if the first timestamp difference value is larger than the second timestamp difference value, outputting the second video data.

12. The audio and video synchronization method of claim 8, further comprising:
- receiving a video stream comprising the first video data and the second video data;
- receiving an audio stream comprising the audio data; and
- generating a Vsync signal comprising the Vsync pulse,
- wherein a frame rate of the audio stream and a frequency of the Vsync signal is lower than a frame rate of the video stream.

13. The audio and video synchronization method of claim 8, wherein the first PTS is smaller than the second PTS.

14. An audio and video processing apparatus, comprising:
- a decoder, configured to decode a video stream and an audio stream to obtain a first video data, a second video data, and an audio data;
- an encoding and transmission unit, configured to output the audio data and a Vsync pulse, and configured to selectively output either the first video data or the second video data; and
- a synchronization controller, coupled with the decoder and the encoding and transmission unit, configured to receive a first PTS of the first video data, a second PTS of the second video data, and a master PTS corresponding to the audio data or to the Vsync pulse, configured to calculate a first timestamp difference value between the first PTS and the master PTS, and configured to calculate a second timestamp difference value between the second PTS and the master PTS,
- wherein the synchronization controller is further configured to indicate the encoding and transmission unit to selectively output either the first video data or the second video data according to the first timestamp difference value, the second timestamp difference value, and whether the first video data has been outputted for a predetermined number of times.

15. The audio and video processing apparatus of claim 14, wherein if the synchronization controller determines that a difference between the first timestamp difference value and the second timestamp difference value is smaller than or equal to a threshold value, and also determines that the first video data has been outputted for more than or equal to the predetermined number of times, the encoding and transmission unit outputs the second video data,
- if the synchronization controller determines that the difference between the first timestamp difference value and the second timestamp difference value is smaller than or equal to the threshold value, and also determines that the first video data has been outputted for less than the predetermined number of times, the encoding and transmission unit outputs the first video data.

16. The audio and video processing apparatus of claim 15, wherein the threshold value is within a range of 20 to 50 ticks.

17. The audio and video processing apparatus of claim 14, wherein if the synchronization controller determines that a difference between the first timestamp difference value and the second timestamp difference value is larger than a threshold value, and also determines that the first timestamp difference value is smaller than the second timestamp difference value, the encoding and transmission unit outputs the first video data, if the synchronization controller determines that the difference between the first timestamp difference value and the second timestamp difference value is larger than the threshold value, and also determines that the first timestamp difference value is larger than the second timestamp difference value, the encoding and transmission unit outputs the second video data.

18. The audio and video processing apparatus of claim 14, wherein the decoder is further configured to decode a video stream and an audio stream to obtain the first video data, the second video data, and the audio data, the encoding and transmission unit is further configured to output a Vsync signal comprising the Vsync pulse, and the predetermined number of times is determined according to a frame rate of the audio stream, a frequency of the Vsync signal, or a frame rate of the video stream.

19. The audio and video processing apparatus of claim 18, wherein the frame rate of the audio stream and the frequency of the Vsync signal are higher than or equal to the frame rate of the video stream.

20. The audio and video processing apparatus of claim 14, wherein the first PTS is smaller than the second PTS.

* * * * *